(12) United States Patent
Fuente Souviron et al.

(10) Patent No.: US 7,352,194 B1
(45) Date of Patent: Apr. 1, 2008

(54) METHOD FOR DETERMINING THE THICKNESS OF A COATING ON A COMPOSITE MATERIAL

(75) Inventors: Antonio Fuente Souviron, Madrid (ES); Joaquin Pascual Fernandez, Sevilla (ES)

(73) Assignee: Airbus Espana, S.L., Madrid (ES)

( * ) Notice: Subject to any disclaimer, the term of this patent is extended or adjusted under 35 U.S.C. 154(b) by 0 days.

(21) Appl. No.: 11/589,677

(22) Filed: Oct. 30, 2006

(30) Foreign Application Priority Data

Sep. 29, 2006 (ES) ................ PCT/ES2006/070140

(51) Int. Cl.
  G01R 27/08 (2006.01)
  G01B 7/06 (2006.01)
  G01B 7/02 (2006.01)
(52) U.S. Cl. .................... 324/716; 324/230; 702/170
(58) Field of Classification Search ................ 324/716, 324/715, 713, 691, 649, 600, 635, 644, 662, 324/671, 699, 229, 230; 702/97, 170
See application file for complete search history.

(56) References Cited

U.S. PATENT DOCUMENTS

| | | | | |
|---|---|---|---|---|
| 4,745,809 A | * | 5/1988 | Collins et al. ................ 73/661 |
| 5,293,132 A | * | 3/1994 | Koch ........................ 324/671 |
| 5,847,562 A | * | 12/1998 | Fulton et al. ................ 324/229 |
| 6,297,648 B1 | * | 10/2001 | Lunden ....................... 324/635 |
| 6,794,886 B1 | * | 9/2004 | Chen et al. .................. 324/716 |
| 6,815,947 B2 | * | 11/2004 | Scheiner et al. ............. 324/230 |
| 6,815,958 B2 | * | 11/2004 | Kesil et al. .................. 324/662 |
| 6,989,675 B2 | * | 1/2006 | Kesil et al. .................. 324/636 |
| 7,173,435 B1 | * | 2/2007 | Fay et al. .................... 324/636 |
| 2003/0038628 A1 | * | 2/2003 | Nath et al. ................... 324/230 |
| 2004/0021461 A1 | * | 2/2004 | Goldfine et al. ............. 324/243 |
| 2004/0227524 A1 | * | 11/2004 | Kesil et al. .................. 324/635 |

* cited by examiner

Primary Examiner—Vincent Q. Nguyen
Assistant Examiner—Hoai-An D. Nguyen
(74) Attorney, Agent, or Firm—Ladas and Parry LLP

(57) ABSTRACT

The invention relates to a method for determining the thickness of a coating on a composite material by applying induced currents wherein the composite material together with its coating is placed on a conducting material, in which circulating electric currents induced by an alternating magnetic field are created, an indirect measurement being subsequently carried out based on the measurement of the lift-off effect that the coating, together with the composite material, offers in induced currents against the mentioned conducting material.

4 Claims, 7 Drawing Sheets

METHOD FOR DETERMINING THE THICKNESS OF A COATING ON A COMPOSITE MATERIAL

FIELD OF THE INVENTION

The present invention relates to a method for determining the thicknesses of coatings on composite materials by means of the application of induced currents.

BACKGROUND OF THE INVENTION

Induced currents or Eddy currents (also known as parasitic currents or Foucault currents) are circulating electric currents induced by an alternating magnetic field in an insulated conductor. Eddy currents are not induced on an insulating material, the alternating magnetic field traversing the mentioned non-conducting material.

The use of induced currents is currently well known as a non-destructive test method for determining the thicknesses of a non-conducting coating on a conducting metal, or the thickness of a non-magnetic metal coating on a magnetic metal. However, currently there is no reliable method for the application of induced currents in the measurement of thicknesses on composite materials, such as carbon fiber, because this material, although it is a conductor, has a very low electric conductivity.

Other type of techniques, such as ultrasound techniques, have currently been proposed as non-destructive test methods for determining the thicknesses on composite materials, although this type of techniques use very complex equipment and have not provided reliable results.

The present invention is oriented to the solution of these drawbacks.

SUMMARY OF THE INVENTION

The present invention proposes an indirect measurement method for determining the thickness of a coating on a composite material, such as carbon fiber, comprising the following steps:
  arranging the composite material together with its coating in a planar configuration such that it has a constant thickness in the measurement areas and comprises a coating-free area;
  arranging the side of the composite material without coating on a sheet of conducting material of a constant thickness;
  generating induced currents on the conducting material by means of a multichannel type induced current generating equipment;
  choosing a low frequency and high penetrating power probe to carry out the measurements, adjusting the gain thereof to the adjustment desired in the measurement;
  carrying out the zero calibration of the method by measuring the coating-free area of the composite material with the probe;
  carrying out a reference calibration by measuring a calibrated composite material fiber with the probe;
  carrying out the measurement of the composite material together with its coating with the probe;
  determining the thickness of the coating of the composite material taking into account the effect of the decrease of the intensity of the induced currents upon traversing the composite material and the coating when said currents move away from the current generating equipment, based on the measurement of the lift-off effect that the coating and the composite material offer in induced currents against the sheet of conducting material.

Other features and advantages of the present invention will be disclosed in the following detailed description of an illustrative embodiment of its object in relation to the attached figures.

DETAILED DESCRIPTION OF THE INVENTION

The method for determining the thickness of a coating on a composite material, such as carbon fiber, developed by the present invention, consists of carrying out an indirect measurement considering the composite material or carbon fiber as a lift-off against a planar metal sheet, such as an aluminium alloy sheet.

The method described in this invention can be applied to a wide range of thicknesses of coatings ranging from 20 µm to 300 µm, because in no case are they so thick that they cannot be traversed by the low frequency technique proposed herein.

Thin thicknesses of carbon fiber, mainly 1 to 5 mm, allow obtaining very reliable results in the measurement of the thicknesses of the coating, because they have a greater relative importance in the separation of variables.

The aluminium sheet must have a suitable thickness, preferably more than 2 mm and must not be plated. 2024, 7075 sheets and the like, in different treatment conditions, are suitable for carrying out the calibration and therefore the measurements.

The results obtained with the present method are compared with micrographic cut measurements which are determining in situations of conflict.

EXAMPLES

The results obtained in a specific embodiment of the invention are set forth below, using a multichannel Zetec MIZ-40 A as an induced current equipment, a Leica Q 550 MW Image Analyzer as micrographic equipment, and an absolute Donut Nortec /R/100 Hz-1 kHz/0.50-1.00 inches, P/N 9215653/S/N FO4173, type probe with the following characteristics as a measuring probe:

Frequency: 950 Hz
Angle: 233°
Gain: 41 dB
Horizontal scale: 2.0 V/D
Vertical scale: 0.4 V/D
Drive: 16

Figure 1:
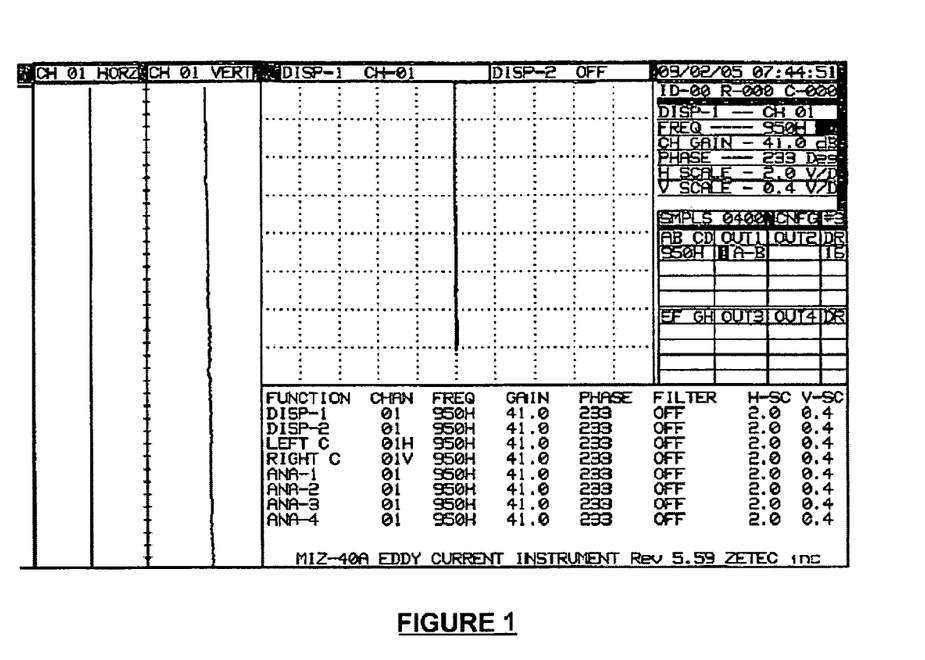
FIG. 1 shows an on-screen representation of the zero calibration of the measurement method object of the invention.

Firstly, the zero calibration is carried out using to that end a paint-free carbon fiber test piece, which is the coating measured in this specific case. As can be seen in FIG. 1, showing the on-screen display of the equipment and in which the impedance vector angle or phase has been adjusted to 233° in order to obtain a vertical representation given that the lift-off effect is being measured, the descending vertical line is located in the first height square of the screen, therefore reaching a height of 1 square (out of 8 in total) corresponding to the paint-free carbon fiber test piece, i.e. to the calibration zero.

Figure 2:
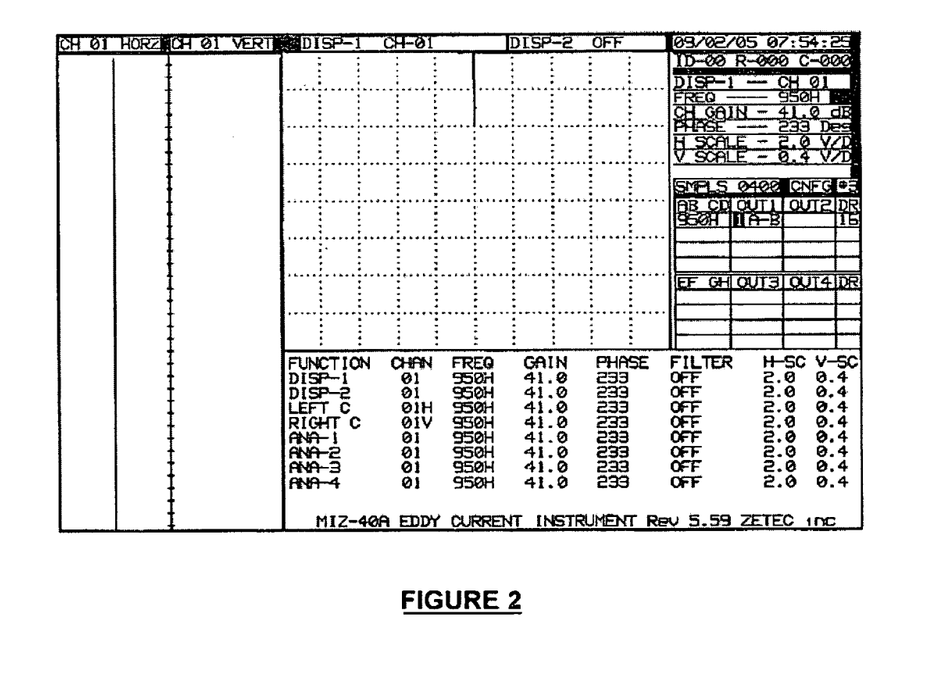
FIG. 2 shows an on-screen representation of the calibration of the measurement method object of the invention using a 175 µm Mylar polyester sheet as a reference.

Then, as shown in FIG. 2, the calibration is carried out based on a 175 μm calibrated Mylar type polyester sheet on a carbon fiber test piece. The lift-off reaches up to height square 6 of the screen, giving a 5 square variation. Five squares of the screen are therefore equivalent to 175 μm in the present calibration (1 square=35 μm). Depending on the margin of thicknesses to be measured it will be possible to calibrate the equipment with sufficient amplitude so as to be able to adjust the calibration in each specific case.

Figure 3:
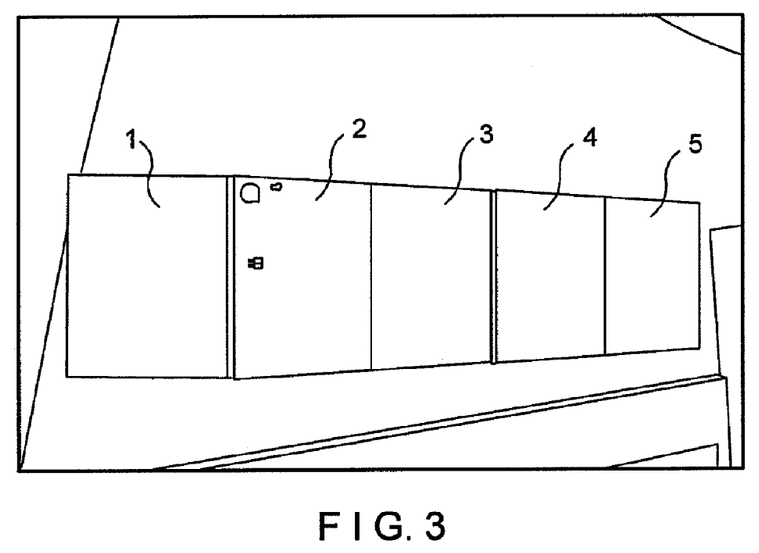
FIG. 3 shows a test piece used for testing the measurement method object of the invention.

One of the test pieces used for the test can be observed in FIG. 3, which test piece comprises 5 work areas: 1 black paint-free area (to calibrate the zero of the equipment); 2 first white paint layer; 3 second yellow paint layer; 4 third grey paint layer and 5 fourth bluish paint layer. Once the previous calibration has been carried out, with the zero adjustment and the 175 μm Mylar type polyester sheet reference, the readings of the thickness of each of the layers in different test pieces was carried out, comparing the readings with the absolute micrograph measurements.

The examined test piece of FIG. 3 has a nominal fiber thickness of 1.6 mm. Smaller or greater thicknesses will evidently need an adjustment of the low frequency probe gain in order to achieve the same amplitude, in the same direction as the thickness. Thus for example, fiber thicknesses of 3.2 mm require 44 dB instead of the 41 dB used in the previous calibration.

Another important issue to be considered is the finishing surface of the carbon fiber to be examined. Composite materials with textured surfaces are very rough, and this can make the measurement of very thin paint thicknesses difficult, particularly if a considerable thickness of said fiber is considered. For small thicknesses, as in this example (1.6 mm), this fact can be minimized by applying pressure with the probe on the fiber and the aluminium support sheet, as well as thanks to the wide rounded configuration of the Donut type probe used.

Figure 4:
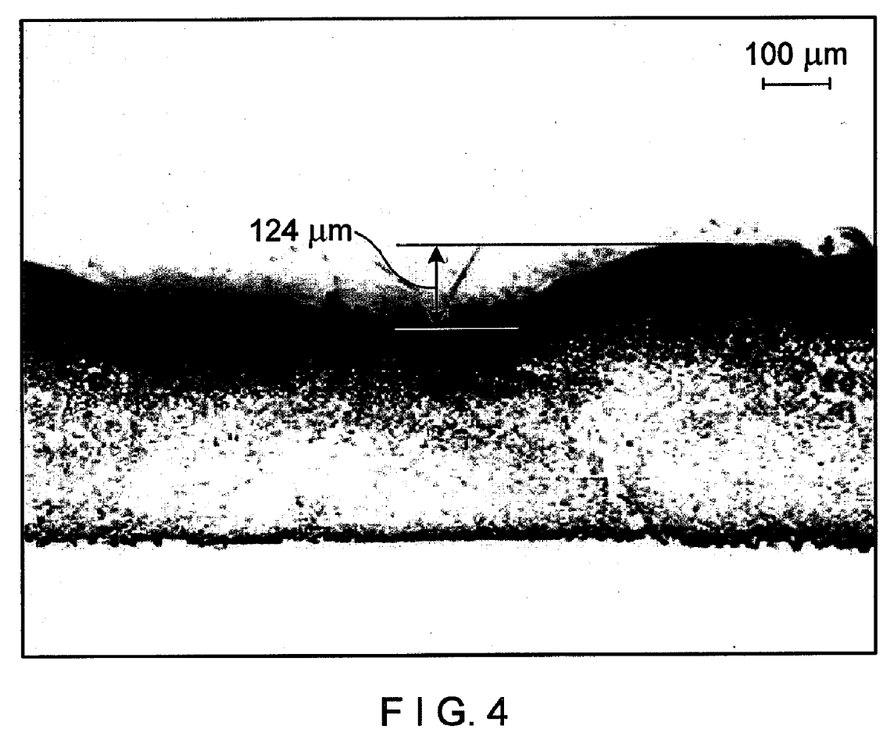
FIG. 4 shows a micrograph showing the roughness of a composite material with textured surface, constituting an additional difficulty in the measurement method of the invention.
Figure 5A:
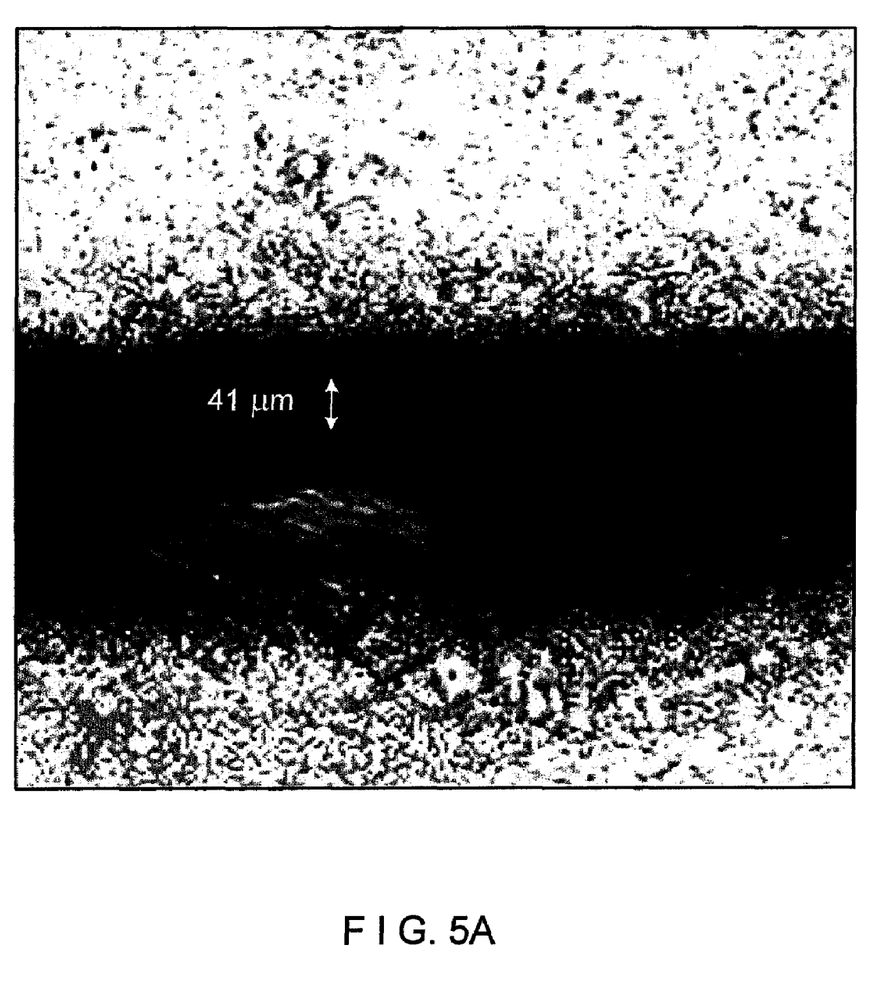
FIGS. 5A-5D show micrographs of $1^{st}$; $1^{st}$ and $2^{nd}$; $1^{st}$, $2^{nd}$ and $3^{rd}$; and $1^{st}$, $2^{nd}$, $3^{rd}$ and $4^{th}$ paint layers on one of the test pieces examined with the measurement method of the invention.
Figure 5B:
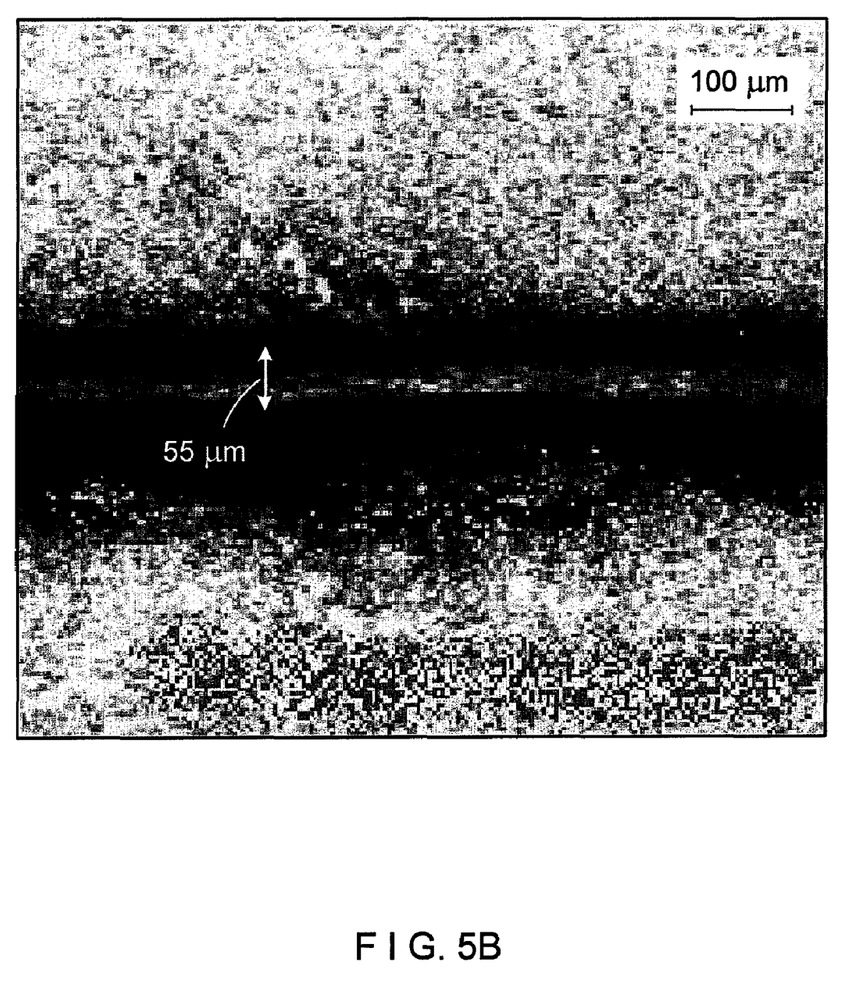
Figure 5C:
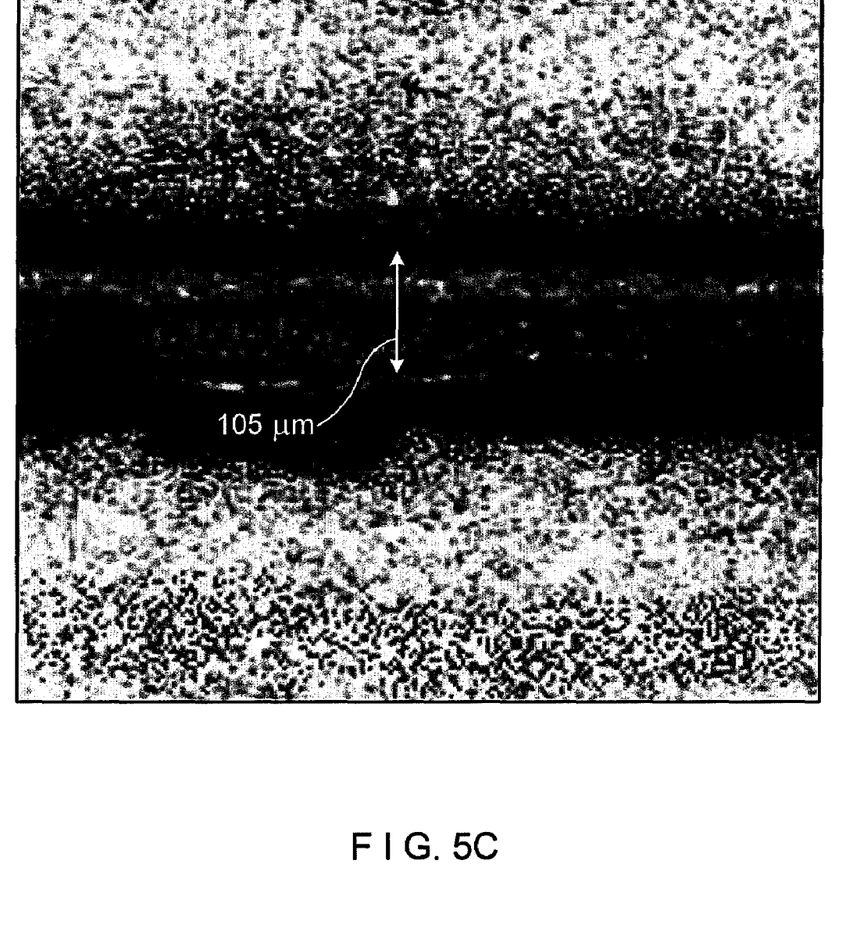
Figure 5D:
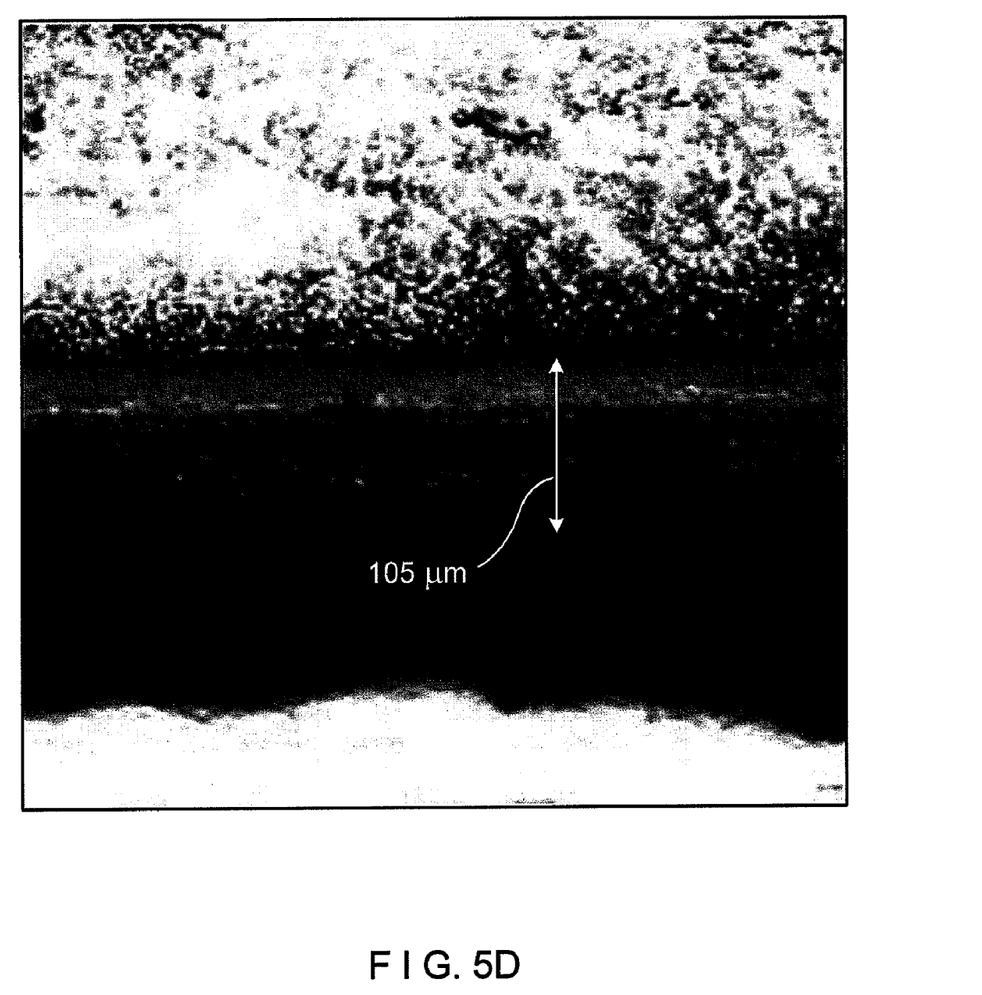

Thus, the micrograph of FIG. 4 represents the roughness of a composite material with textured surface, reaching a maximum value of almost 125 μm.

Another relevant issue in this method is the importance of the calibration zero, which must be carried out between each of the measurements with the aim of preventing as much as possible the fluctuations that may interfere therein. This entails calibrating the zero before each reading.

Table 1 below shows the results obtained in the test pieces tested by the induced current method of the invention versus the real data of the micrographic cut of these test pieces, as well as two Mylar type reference polyester sheets used in the calibration of the method, in the measurement margins.

TABLE 1

| Test piece | Layer | | | | | | | |
|---|---|---|---|---|---|---|---|---|
| | 1 | | 2 | | 3 | | 4 | |
| | Real | Obt. | Real | Obt. | Real | Obt. | Real | Obt. |
| 2 | 42 | 39 | 68 | 49 | 139 | 105 | 172 | 161 |
| 3 | 41 | 35 | 52 | 70 | 114 | 98 | 139 | 140 |
| 4 | 41 | 42 | 55 | 70 | 105 | 105 | 140 | 143 |
| 5 | 43 | 49 | 54 | 70 | 90 | 105 | 135 | 133 |

Mylars: 195/193 18.9/17.5 in μm

Figure 6:
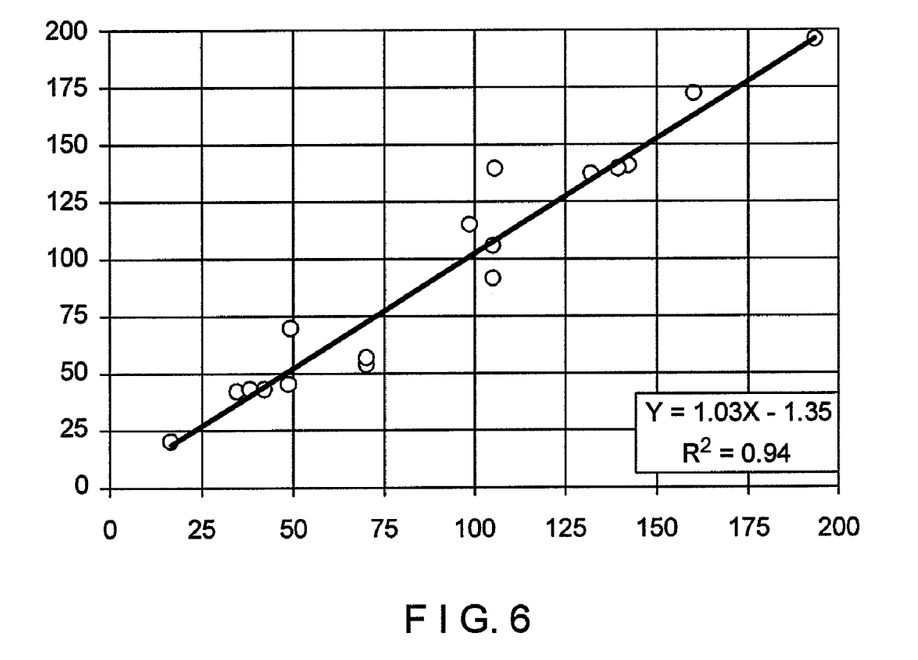
FIG. 6 shows the results curve obtained for the testing of the test pieces examined with the method object of the invention in comparison with real data.
Figure 7:
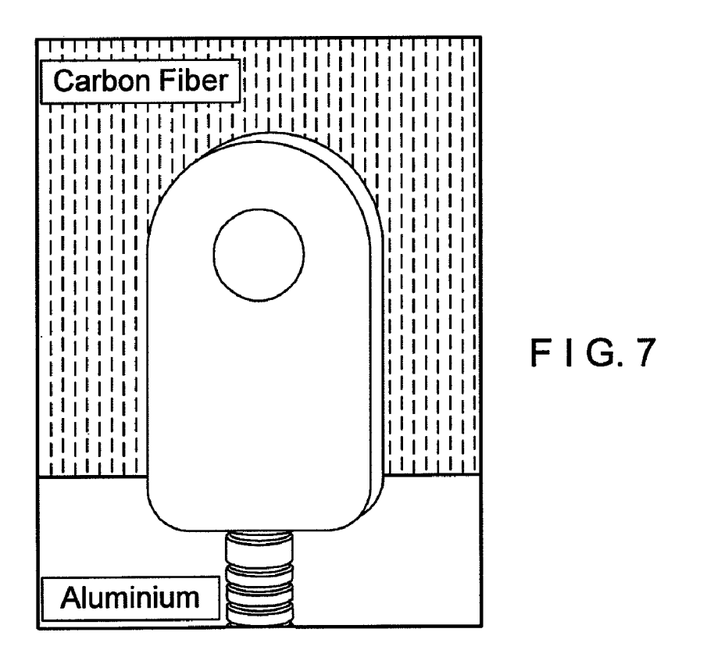
FIG. 7 shows the placing of the measuring probe on the composite material to be measured according to the measurement method of the present invention.

In reference to FIG. 6, showing the linear curve of the obtained results, a greater adjustment in the work margins (40 and 140 μm) and a greater dispersion in the central areas (70 and 100 μm), probably due to a lack of homogeneity in the $2^{nd}$ and $3^{rd}$ paint layers and to the greater relative incidence of the roughness of the fiber since it is a textured surface, can be observed. However, the adjustment is sufficiently good and precise if the starting restrictions are taken into account.

Thus, the method for determining the thickness of a coating on a composite material by using induced currents, developed by the present invention, has the main features that are detailed below:

- the measurement is indirect, considering the carbon fiber coating and the paint coating as a lift-off against a planar aluminium alloy sheet;
- the normally planar configuration allows the access to both sides of the fiber;
- a paint-free area of material is needed to calibrate the zero of the measurement method;
- the zero calibration must take place before any measurement, with the aim of avoiding possible fluctuations of the method:
- the greater the thickness of the fiber, the greater the gain necessary in the measuring probe;
- it is necessary to use a low frequency Donut type probe, with a frequency such that it confers a high penetrating power to it; and
- the obtained adjustment depends on the gain of the probe used, being around 15 μm.

Modifications comprised within the scope defined by the following claims can be introduced in the preferred embodiment which has just been described.

The invention claimed is:
1. A measurement method for determining the thickness of a coating on a composite material wherein it comprises the following steps:
   arranging the composite material together with its coating in a planar configuration such that it has a constant thickness in the measurement areas and comprises a coating-free area;
   arranging the side of the composite material without coating on a sheet of conducting material with a constant thickness;
   generating induced currents on the conducting material by means of a multichannel type induced current generating equipment;
   choosing a low frequency and high penetrating power probe to carry out the measurements, adjusting the gain thereof to the adjustment desired in the measurement;

carrying out the zero calibration of the method by measuring the coating-free area of the composite material with the probe;

carrying out a reference calibration by measuring a calibrated composite material fiber with the probe;

carrying out the measurement of the composite material together with its coating with the probe;

determining the thickness of the coating of the composite material taking into account the effect of the decrease of intensity of the induced currents upon traversing the composite material and the coating when said currents move away from the current generating equipment, based on the measurement of the lift-off effect that the coating and the composite material offer in induced currents against the sheet of conducting material.

2. A measurement method for determining the thickness of a coating on a composite material according to claim 1, wherein the thickness of the coating ranges from 20 to 300 µm.

3. A measurement method for determining the thickness of a coating on a composite material according to claim 1, wherein the composite material is carbon fiber.

4. A measurement method for determining the thickness of a coating on a composite material according to claim 1, wherein the conducting material has a constant thickness greater than or equal to 2 mm.

* * * * *